United States Patent [19]

Cau et al.

[11] Patent Number: 4,525,833

[45] Date of Patent: Jun. 25, 1985

[54] PROCESS FOR TIME-SEQUENCED MULTIPLEXING OF DATA ON A TRANSMISSION MEDIUM AND DEVICES TO IMPLEMENT THIS PROCESS

[75] Inventors: Egidio Cau; Jean P. Lamiral, both of Paris, France

[73] Assignee: Lignes Telegraphiques et Telephoniques, Ste. Honorine, France

[21] Appl. No.: 422,385

[22] Filed: Sep. 24, 1982

[30] Foreign Application Priority Data

Oct. 9, 1981 [FR] France ................................ 81 19081

[51] Int. Cl.³ .............................................. H04J 3/00
[52] U.S. Cl. ........................................ 370/99; 370/77
[58] Field of Search .................................. 370/99, 105

[56] References Cited

U.S. PATENT DOCUMENTS

| | | | |
|---|---|---|---|
| 3,261,918 | 7/1966 | Sisti | 370/105 |
| 3,710,056 | 1/1973 | Tomozawa | 370/99 |
| 3,742,139 | 6/1973 | Boehly et al. | 370/105 |
| 3,772,475 | 11/1973 | Loffreda | 370/105 |
| 3,794,773 | 2/1974 | Jacob et al. | 370/105 |
| 3,932,698 | 1/1976 | Yanagimachi et al. | 370/99 |
| 4,016,368 | 4/1977 | Apple, Jr. | 370/105 |
| 4,382,297 | 5/1983 | Farrow | 370/105 |

OTHER PUBLICATIONS

Ericsson Review, vol. 56, No. 2, 1979–Stockholm (SE) H. J. Frizlen & W. Widl: "10-Channel PCM System", pp. 72–79.

L'Onde Electrique, 1975, vol. 55, No. 7, Paris, France, P. De Laage de Meux: "Transmission de Donnees sur Groupe Secondaire", pp. 373–378.

Cables & Transmission, Annee 32, No. 4, Oct. 1978, Numero Special Paris France, R. Dupuy et al.: "Systeme Transmic 14, Modem de Groupe Secondaire", pp. 632–652.

Primary Examiner—Douglas W. Olms
Assistant Examiner—Wellington Chin
Attorney, Agent, or Firm—Roland Plottel

[57] ABSTRACT

A process for time-sequenced multiplexing of telephone data, PCM coded, on a transmission medium, and more specifically a process for multiplexing three 10-channel systems to form a standard 30-channel system, wherein:

frames and multiframes are identical in structure for all 10-channel systems;

each 10-channel frame contains 11 time intervals of the same length, the first of which contains auxiliary data, for synchronization, channel signalling, etc., and the last ten carrying information to be transmitted, coded by the pulse modulation and coding technique;

each multiframe comprises the same number of frames as the 30-channel system;

signalling and synchronization data is distributed among the first time intervals in the different frames, such distribution ensuring reliable synchronization and minimum delay, during the change from 10 to 30 channels and vice versa.

4 Claims, 6 Drawing Figures

FIG_4

FIG_5

PROCESS FOR TIME-SEQUENCED MULTIPLEXING OF DATA ON A TRANSMISSION MEDIUM AND DEVICES TO IMPLEMENT THIS PROCESS

BACKGROUND OF THE INVENTION

1. Field of the Invention

This invention concerns a process for time-sequenced multiplexing of data on a transmission medium or carrier, more specifically for telephone messages coded by the pulse code modulation (PCM) technique. The invention also concerns multiplexing and demultiplexing devices used to perform this process.

Multiplexing is a method that allows a certain number of information channels or tracks to share a single physical medium or carrier, such as a cable or microwave link. This makes transmission much cheaper than when a separate medium is needed for every channel.

Such multiplexing can be achieved by distribution frequency ranges among the different channels, within the transmission band of the medium. This was the first method used with analog systems. A more recent solution consists of dividing the various channels by time sequence: this technique is used in telephony, in combination with PCM.

Pulse code modulation of a telephone signal involves sampling the analog signal for transmission, then quantizing the pulses resulting from such sampling, and finally coding them digitally; the digitized samples are then transmitted, and decoded at the receiver. When N channels are to be multiplexed on one carrier, sampling and coding are carried out successively for each channel and the resulting N digital samples, together with various auxiliary signals (synchronization, channel signalling, etc.), form what is usually described as a frame. In addition, it is often necessary to define a multiframe, comprising a series of M frames, mainly to simplify transmission of channel signalling data.

Such techniques have to some extent been internationally standardized, particularly as regards time multiplexing of 30 channels on a digital carrier with a capacity of 2,048 Kbits/sec (CCITT Recommendation F 732). For certain purposes, however, multiplexing of a smaller number of channels is preferable: the right compromise has to be found among system capacity, distance to be covered, and local needs. Multiplexing of 10 channels often constitutes such an optimum. The problem then arises of defining a frame and multiframe structure for a system with 10 multiplexed channels that will be compatible with the existing standard 30-channel system. It would be helpful to be able to combine three 10-channel systems in order to connect them to a 30-channel system, and conversely, break up a 30-channel system into 10-channel systems, without the resulting interfaces involving too much complexity or delay.

2. Description of the Prior Art

A number of solutions exist in the prior art. One such solution, for example, is described by Hans Jörg Frizlen and Walter Wild (in *Ericsson Review* No. 2, 1979). However, their performances are limited, in particular by the often serious delays affecting signals from 10-channel systems in order to form a 30-channel multiframe, and vice versa, increasing the complexity and cost of interfaces.

SUMMARY OF THE INVENTION

An object of the invention is a 10-channel multiplexing process which allows subsequent multiplexing of three such 10-channel systems to form a 30-channel system, as described above, and vice versa. For the purposes of this invention:

frames and multiframes are identical in structure for all 10-channel systems;

each 10-channel frame contains eleven 8-bit words or time intervals (IT) of the same length, the last ten containing the information to be transmitted, and the first ($IT_0$) containing auxiliary data for synchronization, channel signalling, etc.;

each multiframe contains the same number of frames as the 30-channel system;

for each multiframe, the word $IT_0$ in the first contains a multiframe synchronization signal, and the word $IT_0$ in even-ranking frames contains a frame synchronization signal, this distribution ensuring reliable synchronization, and minimum synchronization recovery time;

signalling data is divided among the first words in remaining frames, in a structure similar to that of a 30-channel multiframe; with the changeover from three 10-channel systems to one 30-channel system, multiframes in the 10-channel systems are interwoven to form the 30-channel system, so as to ensure minimum delay.

More specifically, this invention concerns a process for time multiplexing of data on a transmission medium, in which data for transmission is coded in the form of binary words, combined in frames and multiframes, a frame containing a series of binary words representing the data for transmission, and auxiliary bits representing at least synchronization and channel-signalling data, and a multiframe containing a series of successive frames, the said process allowing N data channels to be multiplexed on a single carrier, each frame containing $N+1$ binary words of the same length, only the first such words containing auxiliary bits, and following words representing a coded sample of data to be transmitted on each channel respectively, the first word in odd-ranking frames in each multiframe containing synchronization data, channel-signalling data being contained in the first word of even-ranking frames, and being paired in the form $S_i$ and $S_{i+(N/2)}$, where S represents the channel signalling data and i the rank of the channel to which it refers.

An other object of the invention is a device for time-sequenced multiplexing of data on a transmission medium, comprising:

means of generating frequencies corresponding to carrier capacity, frame frequency and word frequency;

a circuit forming a time base, supplying synchronization signals to the rest of the device, on the basis of the frequencies mentioned above;

means of establishing the first word in each frame, receiving the said synchronization signals and signalling data.

An other object of the invention is a data-demultiplexing device, comprising:

means of generating frequencies corresponding to carrier capacity; frame frequency and word frequency, in accordance with the transmission recovery rate;

means of detecting frame and multiframe synchronization data;

a circuit forming a time base, receiving the clock and synchronization signals referred to above, and delivering synchronization signals to the rest of the device;

means of extracting and demultiplexing the first word in each frame, to obtain channel-signalling data.

BRIEF DESCRIPTION OF THE DRAWINGS

Other features of the invention will emerge from the following description of one possible embodiment, with reference to the accompanying figures.

DESCRIPTION OF THE PREFERRED EMBODIMENTS

Figure 1:
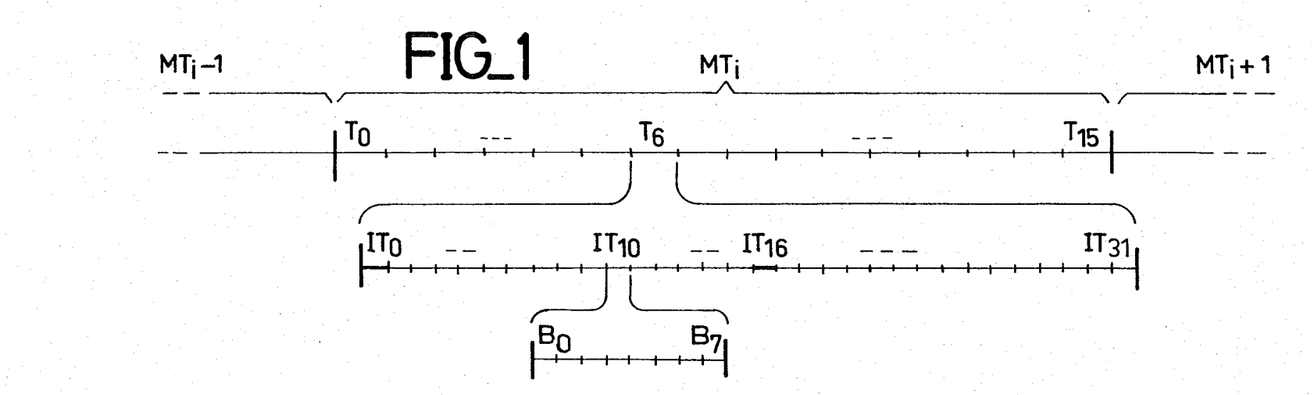
FIG. 1, showing the frame and multiframe structure of a standard 30-channel system.

FIG. 1 shows the time sequence of three multiframes $MT_{i-1}$, $MT_i$ and $MT_{i+1}$, representing multiplexing of 30-channels.

As shown for $MT_i$, each multiframe is formed of 16 successive frames, numbered $T_0$ to $T_{15}$, with identical structure.

As shown for $T_6$, each frame is formed of 32 time intervals, of the same length, numbered $IT_0$ to $IT_{31}$.

Thirty of these time intervals, $IT_1$ to $IT_{15}$ and $IT_{17}$ to $IT_{31}$, are used for data transmission. They each contains 8 bits, as shown for $IT_{10}$, numbered $B_0$ to $B_7$. As already stated, for telephone transmission each 8-bit word represents digital coding of a sample of the signal to be transmitted on one of the 30 multiplexed channels, one frame therefore comprising all 130 words. Naturally, these time intervals can be used for transmission of non-telephone information such as binary data sent from one computer to another.

The remaining two time intervals $IT_0$ and $IT_{16}$, marked with thick lines on the figure, are assigned to auxiliary data: synchronization (of frames and multiframes), signalling (of each of the 30 channels), service data (also referred to as "reserves"), and data for low-speed transmission. $IT_{16}$, specifically used for channel signalling, is illustrated in table I below.

TABLE I

| FRAME N° | 30-CHANNEL MULTIFRAME CONTENTS OF $IT_{16}$ | | | | | | | |
|---|---|---|---|---|---|---|---|---|
| | $B_0$ | $B_1$ | $B_2$ | $B_3$ | $B_4$ | $B_5$ | $B_6$ | $B_7$ |
| $T_0$ | | VMT | | | R | A | R | R |
| $T_1$ | | $S_1$ | | | | $S_{16}$ | | |
| $T_2$ | | $S_2$ | | | | $S_{17}$ | | |
| $T_3$ | | $S_3$ | | | | $S_{18}$ | | |
| $T_4$ | | $S_4$ | | | | $S_{19}$ | | |
| $T_5$ | | $S_5$ | | | | $S_{20}$ | | |
| $T_6$ | | $S_6$ | | | | $S_{21}$ | | |
| $T_7$ | | $S_7$ | | | | $S_{22}$ | | |
| $T_8$ | | $S_8$ | | | | $S_{23}$ | | |
| $T_9$ | | $S_9$ | | | | $S_{24}$ | | |
| $T_{10}$ | | $S_{10}$ | | | | $S_{25}$ | | |
| $T_{11}$ | | $S_{11}$ | | | | $S_{26}$ | | |
| $T_{12}$ | | $S_{12}$ | | | | $S_{27}$ | | |
| $T_{13}$ | | $S_{13}$ | | | | $S_{28}$ | | |
| $T_{14}$ | | $S_{14}$ | | | | $S_{29}$ | | |
| $T_{15}$ | | $S_{15}$ | | | | $S_{30}$ | | |

TABLE I-continued

| FRAME N° | 30-CHANNEL MULTIFRAME CONTENTS OF $IT_{16}$ | | | | | | | |
|---|---|---|---|---|---|---|---|---|
| | $B_0$ | $B_1$ | $B_2$ | $B_3$ | $B_4$ | $B_5$ | $B_6$ | $B_7$ |
| $T_{15}$ | | $S_{15}$ | | | | $S_{30}$ | | |

The maximum frequency transmitted on a telephone channel is known to be 3,400 Hz. The sampling frequency adopted for the analog signal to be transmitted is therefore 8 KHz, giving a duration for 125 μs for each frame, since each multiplexed channel is sampled once on each frame. The 16-frame multiframe therefore lasts 2 ms. The 125 μs frame consists of 21 time intervals of 8 bits each, so that the capacity of the carrier may be calculated to be $$\frac{8 \times 32}{125 \times 10^{-6}}$$

i.e. 2,048 Kbits/s.

Table I above shows the content of time interval $IT_{16}$, in each of the frames forming a multiframe in the 30-channel system in FIG. 1.

In this table, the first four bits in frame $T_0$ contain a multiframe synchronization signal VMT (frame synchronization signals being contained in $IT_0$), and the second four are reserve or service bits R, and an alarm bit A relating to the multiframe; other frames contain channel-signalling signals $S_i$, where i=1 to 30, each expressed in four bits. These four signalling bits may be connected by coding to form a word, or be left separate, in which case they define four transmission tracks in each channel, commonly numbered a, b, c and d.

Table I shows that signalling data is carried by $IT_{16}$ only from frame $T_1$ on, and that channels are divided into two groups of 15 channels each, frame $T_1$ signalling channels 1 and 16, frame $T_2$ channels 2 and 17, and so on, up to frame $T_{15}$, which signals the last channels in both groups 15 and 30.

Figure 2:
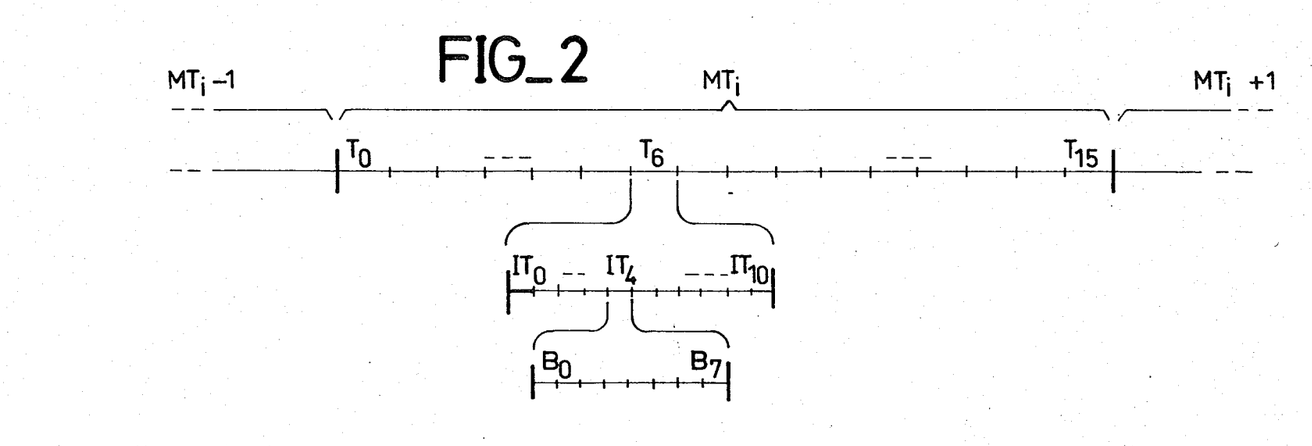
FIG. 2, showing the frame and multiframe structure of a 10-channel system as described in this invention.

In the same way as FIG. 1, FIG. 2 shows the structure of the multiframe and frame in the system proposed in this invention, for multiplexing of 10 channels.

The figure shows the time sequence of three multiframes $MT_{i-1}$, $MT_i$ and $MT_{i+1}$. Each multiframe, as shown for $MT_i$ in FIG. 2, comprises 16 frames, numbered $T_0$ to $T_{15}$, all identical, and all lasting 125 μs, the multiframe in this system thus being identical with the 30-channel system multiframe in FIG. 1.

Each of the frames in FIG. 2, as shown for $T_6$, contains only 11 time intervals. Ten of these, $IT_1$ to $IT_{10}$, are assigned to the 10 channels to be multiplexed and, like the time intervals in the 30-channel system, contain words of 8 bits, numbered $B_0$ to $B_7$, representing digital coding of a sample of the signal to be transmitted by the channel. The first time interval $IT_0$ in each frame, marked with a thick line in the figure, performs the auxiliary functions of both $IT_0$ and $IT_{16}$ in the 30-channel system, namely frame synchronization, multiframe synchronization, channel signalling, etc.

In such a system, each time interval lasts approximately 11.36 μs, and the carrier on which data is multiplexed therefore has a capacity of $$\frac{8 \times 11}{125 \times 10^{-6}}$$

i.e. 704 Kbits/sec.

Table II below shows the contents of $IT_0$, for each of the frames forming a multiframe.

In this table, the time interval $IT_0$ in frame $T_0$ contains a 4-bit multiframe synchronization signal VMT, which may, for example, be 0000, and the second four bits in this same frame are, for example, service or reserve bits R, as in the 30-channel system.

Frame $T_1$ and all following uneven-numbered ranking frames are used for frame synchronization, containing after a free bit marked with an asterisk a 7-bit VT, which may, for example, be 0011011.

TABLE II

| | 10-CHANNEL MULTIFRAME | | | | | | | |
|---|---|---|---|---|---|---|---|---|
| | CONTENTS OF $IT_0$ | | | | | | | |
| FRAME N° | $B_0$ | $B_1$ | $B_2$ | $B_3$ | $B_4$ | $B_5$ | $B_6$ | $B_7$ |
| $T_0$ | ← | ← | (VMT) | → | → | R | R | R | R |
| $T_1$ | * | ← | ← | ← | ← | (VT) | → | → | → |
| $T_2$ | ← | ← | ($S_1$) | → | → | ← | ← | ($S_6$) | → | → |
| $T_3$ | * | ← | ← | ← | ← | (VT) | → | → | → |
| $T_4$ | ← | ← | ($S_2$) | → | → | ← | ← | ($S_7$) | → | → |
| $T_5$ | * | ← | ← | ← | ← | (VT) | → | → | → |
| $T_6$ | Z | Z | Z | 1 | Z | Z | Z | Z |
| $T_7$ | * | ← | ← | ← | ← | (VT) | → | → | → |
| $T_8$ | ← | ← | ($S_3$) | → | → | ← | ← | ($S_8$) | → | → |
| $T_9$ | * | ← | ← | ← | ← | (VT) | → | → | → |
| $T_{10}$ | Z | Z | Z | 1 | Z | Z | Z | Z |
| $T_{11}$ | * | ← | ← | ← | ← | (VT) | → | → | → |
| $T_{12}$ | ← | ← | ($S_4$) | → | → | ← | ← | ($S_9$) | → | → |
| $T_{13}$ | * | ← | ← | ← | ← | (VT) | → | → | → |
| $T_{14}$ | ← | ← | ($S_5$) | → | → | ← | ← | ($S_{10}$) | → | → |
| $T_{15}$ | * | ← | ← | ← | ← | (VT) | → | → | → |

Subsequent uneven-ranking frames are assigned, as symmetrically as possible, either to channel-signalling data S, or low-speed data Z. More precisely, frame $T_2$ transmits signalling words for channels 1 and 6, on four bits for each channel $T_4$ does the same for channels 2 and 7, $T_8$ for channels 3 and 8, and so on, to $T_{14}$, which contains words for channels 5 and 10. In exactly the same way as for the 30-channel multiframe, frames are divided into two series, and channel-signalling data is transmitted in parallel for both series. The remaining frames $T_6$ and $T_{10}$ therefore transmit low-speed data Z, except that bit $B_3$ contains a signal intended to prevent any risk of confusion with the multiframe synchronization word VMT: in the straightforward case where VMT=0000, any one of bits $B_0$ to $B_3$ can be made equal to 1.

Table III below shows the correspondance adopted between each of the channels in a 30-channel system and each of the channels in three 10-channel systems. This table shows the number of the channels in the systems concerned, not IT numbers.

This table reveals the following correspondence:
channel 1 in the first 10-channel system corresponds to channel 1 in the 30-channel system;
channel 1 in the second 10-channel system corresponds to channel 2 in the 30-channel system;
channel 1 in the third 10-channel system corresponds to channel 3 in the 30-channel system;
channel 2 in the first 10-channel system corresponds to channel 4 in the 30-channel system;
and so on.

TABLE III

| 10-channel system: channel n° | | 1 | 2 | 3 | 4 | 5 | 6 | 7 | 8 | 9 | 10 |
|---|---|---|---|---|---|---|---|---|---|---|---|
| 30-channel system: channel n° | 1st 10-channel system | 1 | 4 | 7 | 10 | 13 | 16 | 19 | 22 | 25 | 28 |
| | 2nd 10-channel system | 2 | 5 | 8 | 11 | 14 | 17 | 20 | 23 | 26 | 29 |
| | 3rd 10-channel system | 3 | 6 | 9 | 12 | 15 | 18 | 21 | 24 | 27 | 30 |

In other words, the 10-channel systems are interwoven, which to a large extent reduces delay caused by moving from a 10-channel to a 30-channel system, as shown in table IV below. Other configurations are possible, in fact, for example those described in the article referred to earlier, in which the 10-channel systems are placed side by side, i.e. the 10-channels in the first system correspond to the first 10 channels in the 30-channel system, the 10 channels in the second system to the next 10 channels (20 to 29) in the 30-channel system, and so on. The main drawback of such a system, as already stated, is the quite long delay in changing from 10 channels to 30 channels.

Table IV below, based on tables II and III, shows the time interval $IT_0$ for each frame in the three 10-channel systems. $IT_0$ specifically contains signalling data. The table also shows the correspondence in time between these frames and those in a 30-channel system, for which one time interval $IT_{16}$ is represented. The table is based on the supposition that multiframes in 10-channel systems are synchronized, i.e. that the three starting points coincide in time.

TABLE IV

| | | 10-channel systems | | | 30-channel system | | |
|---|---|---|---|---|---|---|---|
| Multi-frame n° | Frame N° | $IT_0$ 1st system | $IT_0$ 2nd system | $IT_0$ 3rd system | $IT_{16}$ | Frame N° | Multi-frame n° |
| i | $T_0$ | VMT·R | VMT·R | VMT·R | $S_{15}·S_{30}$ | $T_{15}$ | i − 1 |
| | $T_1$ | VT | VT | VT | VMT·RA | $T_0$ | |
| | $T_2$ | $S_1·S_{16}$ | $S_2·S_{17}$ | $S_3·S_{18}$ | $S_1·S_{16}$ | $T_1$ | |
| | $T_3$ | VT | VT | VT | $S_2·S_{17}$ | $T_2$ | |
| | $T_4$ | $S_4·S_{19}$ | $S_5·S_{20}$ | $S_6·S_{21}$ | $S_3·S_{18}$ | $T_3$ | |
| | $T_5$ | VT | VT | VT | $S_4·S_{19}$ | $T_4$ | |
| | $T_6$ | Z | Z | Z | $S_5·S_{20}$ | $T_5$ | |
| | $T_7$ | VT | VT | VT | $S_6·S_{21}$ | $T_6$ | |
| | $T_8$ | $S_7·S_{22}$ | $S_8·S_{23}$ | $S_9·S_{24}$ | $S_7·S_{22}$ | $T_7$ | |
| | $T_9$ | VT | VT | VT | $S_8·S_{23}$ | $T_8$ | |
| | $T_{10}$ | $S_{10}·S_{25}$ | $S_{11}·S_{26}$ | $S_{12}·S_{27}$ | $S_9·S_{24}$ | $T_9$ | |
| | $T_{11}$ | VT | VT | VT | $S_{10}·S_{25}$ | $T_{10}$ | |
| | $T_{12}$ | Z | Z | Z | $S_{11}·S_{26}$ | $T_{11}$ | |
| | $T_{13}$ | VT | VT | VT | $S_{12}·S_{27}$ | $T_{12}$ | |
| | $T_{14}$ | $S_{13}·S_{28}$ | $S_{14}·S_{29}$ | $S_{15}·S_{30}$ | $S_{13}·S_{28}$ | $T_{13}$ | |
| | $T_{15}$ | VT | VT | VT | $S_{14}·S_{29}$ | $T_{14}$ | |
| i + 1 | $T_0$ | VMT·R | VMT·R | VMT·R | $S_{15}·S_{30}$ | $T_{15}$ | |

TABLE IV-continued

| | | 10-channel systems | | | 30-channel system | | |
|---|---|---|---|---|---|---|---|
| | | $IT_0$ | $IT_0$ | $IT_0$ | | | |
| Multi-frame n° | Frame N° | 1st system | 2nd system | 3rd system | $IT_{16}$ | Frame N° | Multi-frame n° |
| | $T_1$ | VT | VT | VT | VMT · RA | $T_0$ | $i+1$ |
| ... | | | | | | | ... |

As may be seen by referring directly to frame $T_2$ in the 10-channel systems, simultaneous signalling is available of channels 1, 16, 2, 17, 3 and 18 which, as column $IT_{16}$ shows, are the signals needed for frames $T_1$, $T_2$ and $T_3$ in the 30-channel system. Consequently, the signalling data contained in $T_2$ in the 10-channel systems is transmitted in frames $T_1$, $T_2$ and $T_3$ of the 30-channel system without delay for $S_1$ and $S_{16}$ ($T_1$), with on frame delay for $S_2$ and $S_{17}$ ($T_2$) and with two frames delay for $S_3$ and $S_{18}$ ($T_3$). Frame $T_3$ in the 10-channel systems is used only for the frame synchronization, which is peculiar to the 10-channel system; meanwhile, the 30-channel system continues to process channel signalling data already supplied by the 10-channel systems. Frame $T_4$ in the 10-channel systems again supplies six channel signalling words, which will be processed in frames $T_4$ to $T_6$ of the 30-channel system. A delay of one to three frames of the 30-channel system then appears on the 10-channel systems. While the 30-channel system is establishing its frames $T_4$, $T_5$ and $T_6$, the 10-channel systems use the $IT_0$ time intervals for frame synchronization ($T_5$ and $T_7$) and transmission of low-speed date Z ($T_6$). For frame $T_8$ of the 10-channel system, the situation is similar to that for frame $T_2$, in which the 10-channel systems supply channel-signalling data for the following three frames in the 30-channel system ($T_7$ to $T_9$); and the same applies to frame $t_{10}$ of the 10-channel systems and frames $T_{10}$ to $T_{12}$ of the 30-channel system. Frame $T_{14}$ of the 10-channel systems supplies the signals needed for the last three frames of the 30-channel multiframe, frame $T_{15}$ of the 30-channel system then being synchronized with frame $T_0$ of multiframe $i+1$ in the 10-channel systems, frame $T_0$ of the 10-channel systems being unnecessary for signalling of the 30-channel system. Frame $T_1$ of the 10-channel systems are synchronized with frame $T_0$ of the 30-channel system, none containing signalling data.

For multiplexing of the three 10-channel systems to form a 30-channel system, the delay therefore ranges from 0 to 3 frames, the average being between 1 and 2 frames—much better than in existing systems—and arising from distribution of signalling data among the different frames of the 10-channel systems.

A similar table could be drawn up for demultiplexing of a 30-channel system into three 10-channel systems. It would show complementary delays ranging in the same way from 0 to 3 frames.

Figure 3:
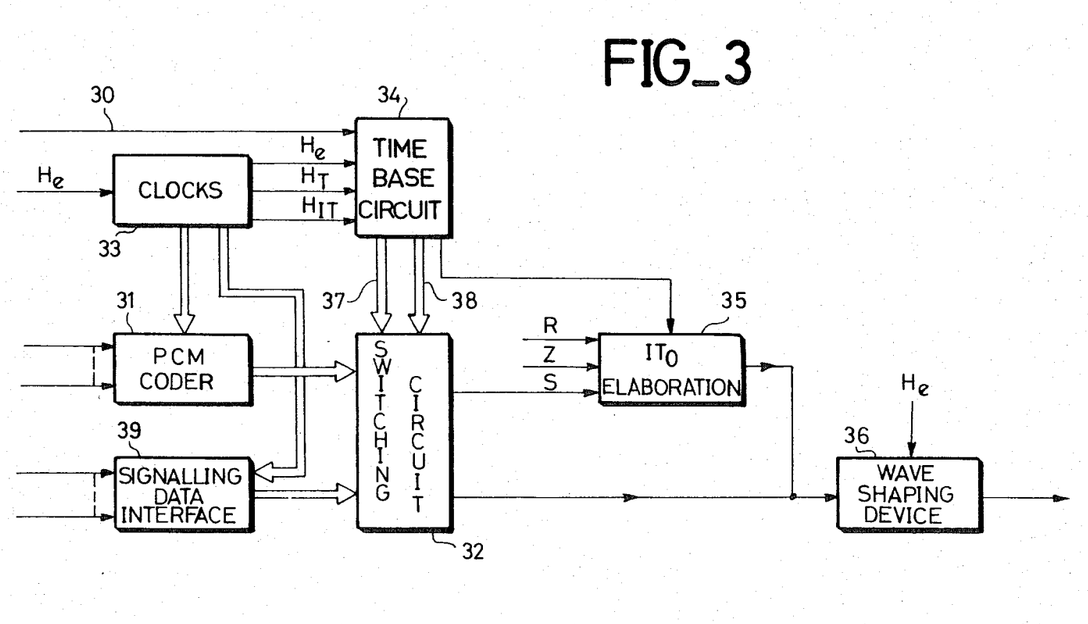
FIG. 3, showing one embodiment of a 10-channel multiplexer as described in this invention.

FIG. 3 shows a 10-channel multiplexer to implement the process proposed in this invention, receiving 10 parallel channels and delivering in series a multiframe as described above.

This figure shows a coder (31) receiving the 10 data channels, such as telephone messages, in which case the coder carries out PCM code; a set of clocks (33) receiving a frequency $H_e$ corresponding to carrier capacity (in the numerical example above this is 704 KHz), either generated by an internal generator, or extracted from the signals received; a device (35) to establish time interval $IT_0$ in each frame; and a time base circuit (34).

The clocks (33) are designed to generate, on the basis of the frequency $H_e$, a frequency $H_T$ representing frame frequency (8 KHz in the numerical example given above), and a frequency $H_{IT}$ corresponding to the succession of time intervals (88 KHz, again in the numerical example above). These clock signals are delivered to the time base circuit (34), coder (31) and an interface (39).

The time base circuit (34) is a set of logic circuits receiving the various frequencies $H_e$, $H_T$ and $H_{IT}$, as well as an initialization signal (connection 30), and delivering:

a frame-start synchronization signal to the $IT_0$ establishment circuit (35);

on a parallel 10-bit bus (37), adressing data for the 10 channels, time-sequenced;

on a parallel 5-bit bus (38), signalling adressing data.

These two buses (37 and 38) lead to a switching circuit (32), which also receives, first from the coder (31) in parallel, 10 connections carrying the data of the 10 channels, in the form of 8-bit words for each channel and, second, 10-channel signalling connections, in 4-bit words for each of the same channels, from an interface (39). The switching device (32) delivers in series data for transmission, sequenced by the time base (34), to a wave-shaping device (36), which also receives the frequency $H_e$, and delivers the frame to be transmitted on the carrier.

In parallel, the switching device (32) delivers signalling data S in series for the 10 channels, on the order of the time base circuit (34), to an $IT_0$ formulation circuit (35), which also receives reserve bits R and low-speed digital data Z to be contained in $IT_0$. This circuit is made up from standard multiplexers and supplies $IT_0$ on the order of the time base circuit (34), as defined in table II. The formulation circuit (35) supplies $IT_0$ signals to the wave-shaping device (36), properly sequenced in relation to data delivered directly by the switching circuit (32) to this wave-shaping device (36).

Figure 4:
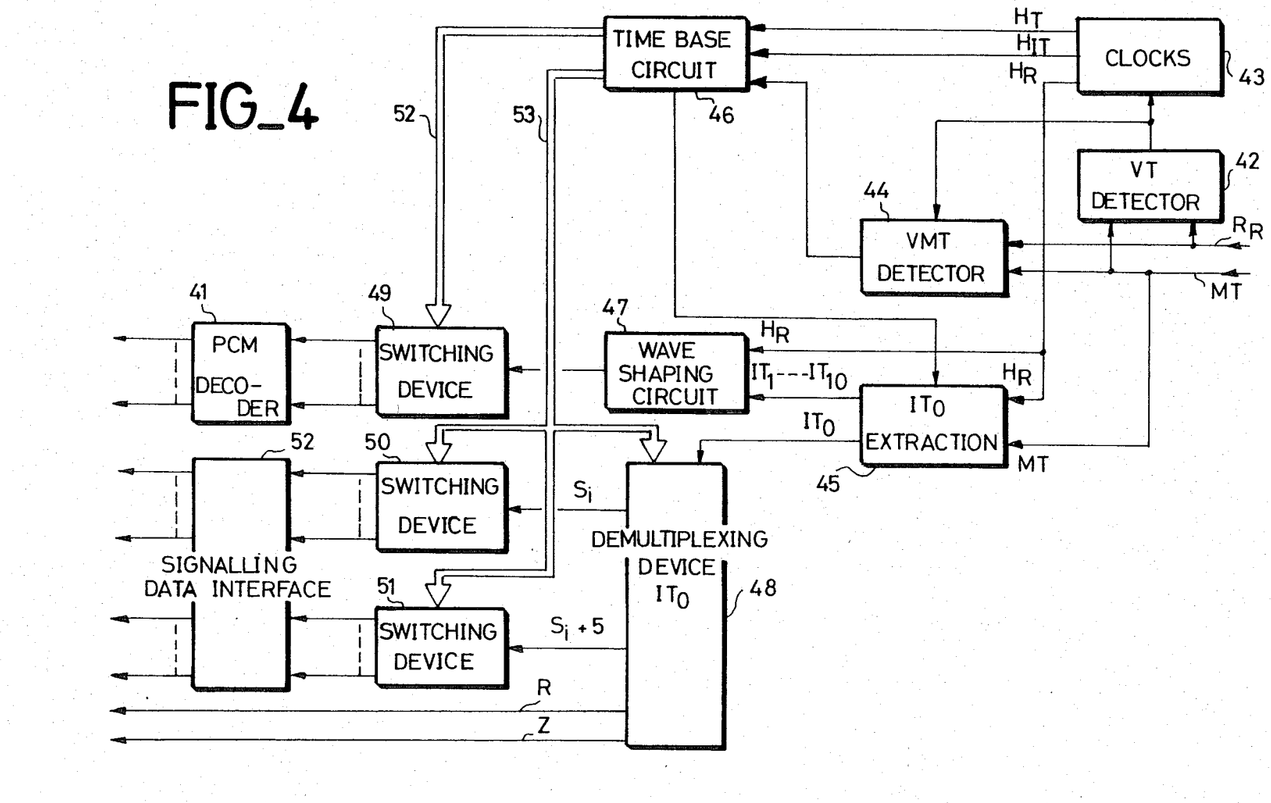
FIG. 4, showing one embodiment of a 10-channel demultiplexer as described in this invention.

FIG. 4 shows a demultiplexer to implement the process proposed in this invention, receiving a 10-channel multiframe as defined above, and delivering 10 data channels with their accompanying channel-signalling data.

This device receives multiframe MT of a 10-channel system, expressed in binary, and the recovery rate $R_R$. These are transmitted, first to a VT-detector circuit (42) which, on the basis of a given synchronization criterion, decides on possible regaining of synchronization, as described in French Patent Application No. 81 02412. For this purpose, it delivers a synchronization pulse, for example at frame frequency. A VMT-detector circuit (44) receives $R_R$ and multiframe MT, together with the synchronization pulse from the VT-detector circuit (42), which dispatches this same pulse, at frame frequency, to a set of clocks (43). These deliver a clock signal $H_R$ at the frequency corresponding to line capacity (704 KHz in the digital example above) and two clock signals $H_T$ and $H_{IT}$, representing frame frequency and time interval frequency respectively.

A set of logic circuits (46) forming a time base receives, first, the multiframe-start synchronization signal delivered by the VMT-detector circuit (44), and, second, frequencies $H_T$ and $H_{IT}$ delivered by the clocks (43), and delivers various logic signals in time:

a frame-start synchronization pulse to a circuit (45) which extracts $IT_0$ from each frame;

on a parallel 10-bit bus (52), time-sequence adressing of different channels;

on a parallel 5-bit bus (53), time-sequence adressing of signalling data.

The $IT_0$ extraction circuit (45) receives the multiframe MT and frequency $H_R$, and delivers, first the $IT_0$ in each frame, in the form of 8 bits in series, to an $IT_0$ demultiplexing device (48), and, second, other time intervals ($IT_1$ to $IT_{10}$), each of which represents coding of a data sample circulating on one of the 10 multiplexed channels, to a wave-shaping circuit (47), which also receives the frequency $H_R$, and which delivers ITs in series to a switching device (49), which also receives channel adressing (bus 52), and supplies the 10 channels in parallel.

The $IT_0$ from the extraction circuit (45) is demultiplexed by a circuit (48), on the order of a bus (53) from the time base circuit (46). The demultiplexer circuit (48) delivers frame i signal $S_i$ to a switching circuit (50) at the same time as frame i+1 signal $S_{i+1}$ to another switching circuit (51), and possibly service bits R and digital data Z.

Switching circuits (50 and 51) each have five outputs; they demultiplex signalling data received ($S_i$ and $S_{i+1}$), on the order of the bus (53) from the time base circuit (46).

Another switching device (49) delivers demultiplexed data to a decoder (41), possibly a PCM device, and which restores the 10 telephone channels. In parallel to this, the other switching devices (50 and 51) deliver signalling data to an interface (52).

Figure 5:
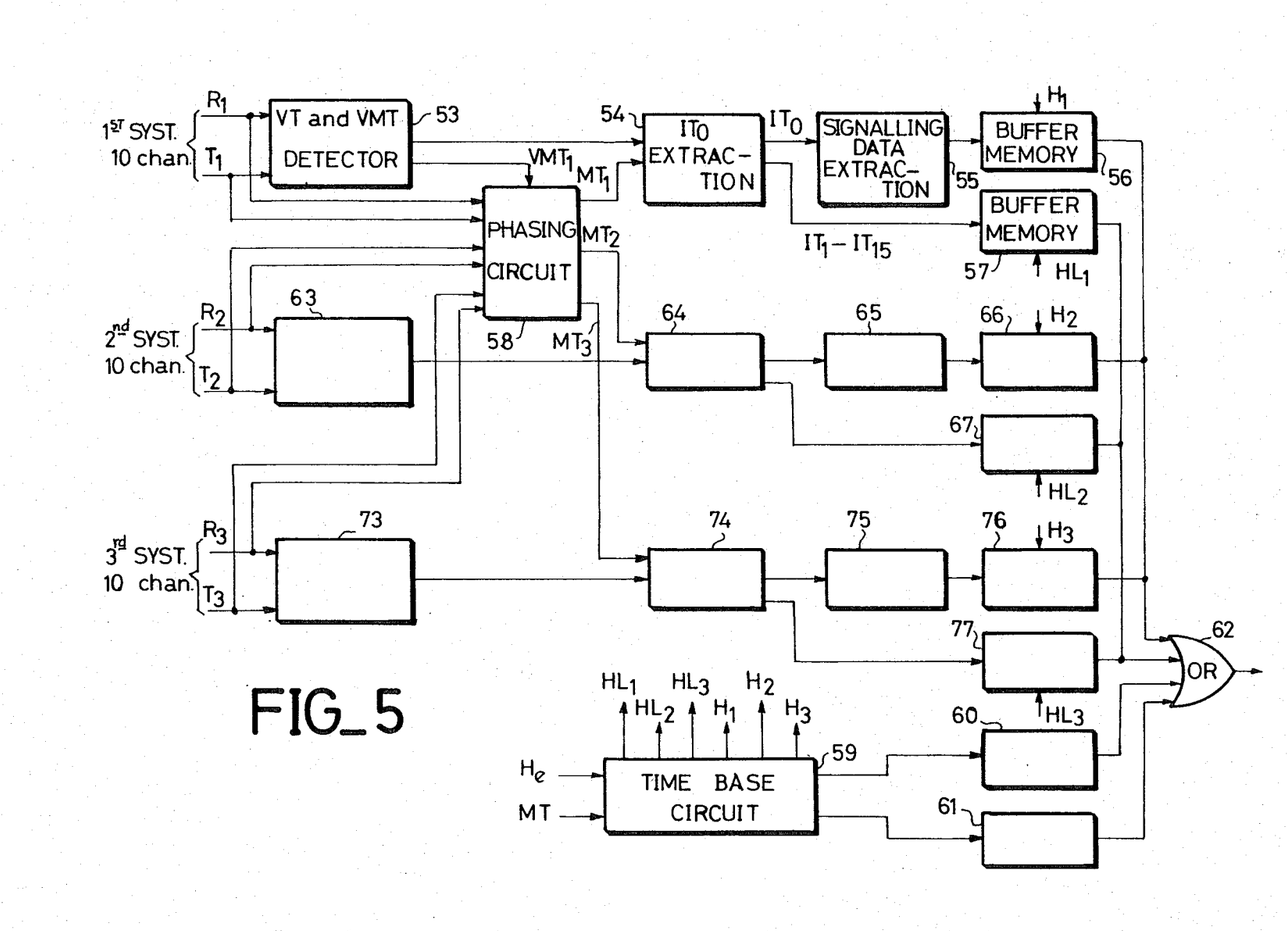
FIG. 5, showing one embodiment of a 3×10-channel multiplexer as described in this invention.

FIG. 5 shows one embodiment of a 3×10-channel multiplexer.

Each of the ten channels is represented by two signals: the sequence of frame $T_i$, expressed in binary code, and its associated rate of recovery $R_i$, where i = 1, 2 or 3 respectively, for each of the three systems.

The first 10-channel system ($T_1$, $R_1$) comprises a VT and VMT-detector circuit (53), similar to the combination of circuits 42, 43 and 44 in FIG. 4, and followed by an $IT_0$-extraction circuit (54), signalling data extraction circuit (55), in accordance with table II above. Other time intervals ($IT_1$ to $IT_{15}$) are also available at the $IT_0$-extraction circuit output, on another connection.

Both data for transmission and signalling data have to be stored temporarily in FIFO ("first in first out") buffer memories (56 for $IT_0$ and 57 for other ITs), to form the 30-channel multiframe illustrated in table IV.

Similar sets of circuits are provided for the second and third systems (63 to 67, 73 to 77).

In addition, since the three 10-channel systems are independent of one another, multiframe phasing has to be carried out. This is done with buffer memories in a circuit (58), which receives $R_i$ and $T_i$ signals and also a VMT signal for one of the systems (the first system in FIG. 5). This circuit (58) supplies multiframes $MT_1$, $MT_2$ and $MT_3$ to $IT_0$ extraction circuits (54, 64 and 74).

Finally, the device comprises a general time base circuit (59), which receives a clock signal $H_e$ at the transmission frequency of the 30-channel system (2.048 KHz in the digital example above), and a 30-channel multiframe initialization or synchronization signal, which delivers the following signals, in a time sequence:

signals $H_1$, $H_2$, $H_3$ to 3 memories (56, 66 and 76), which sequence signalling data needed to form $IT_{16}$ in the 30-channel frame;

signals $HL_1$, $HL_2$, $HL_3$ to 3 memories (57, 67 and 77), which sequence date corresponding to $IT_1$ to $IT_{15}$ and $IT_{17}$ to $IT_{31}$;

a 30-channel multiframe synchronization signal, supplied to a 30-channel VMT-formulation circuit (60), completing the 30-channel time interval $IT_{16}$;

a 30-channel frame synchronization signal, supplied to a 30-channel $IT_0$-formulation circuit.

Signals from circuits 56/76, 57/77, 60 and 61 are brought together, for example in a circuit (62) performing the OR logic function, in order to form the 30-channel frame; this circuit is possibly followed by a wave-shaping device, not shown in the figure.

Figure 6:
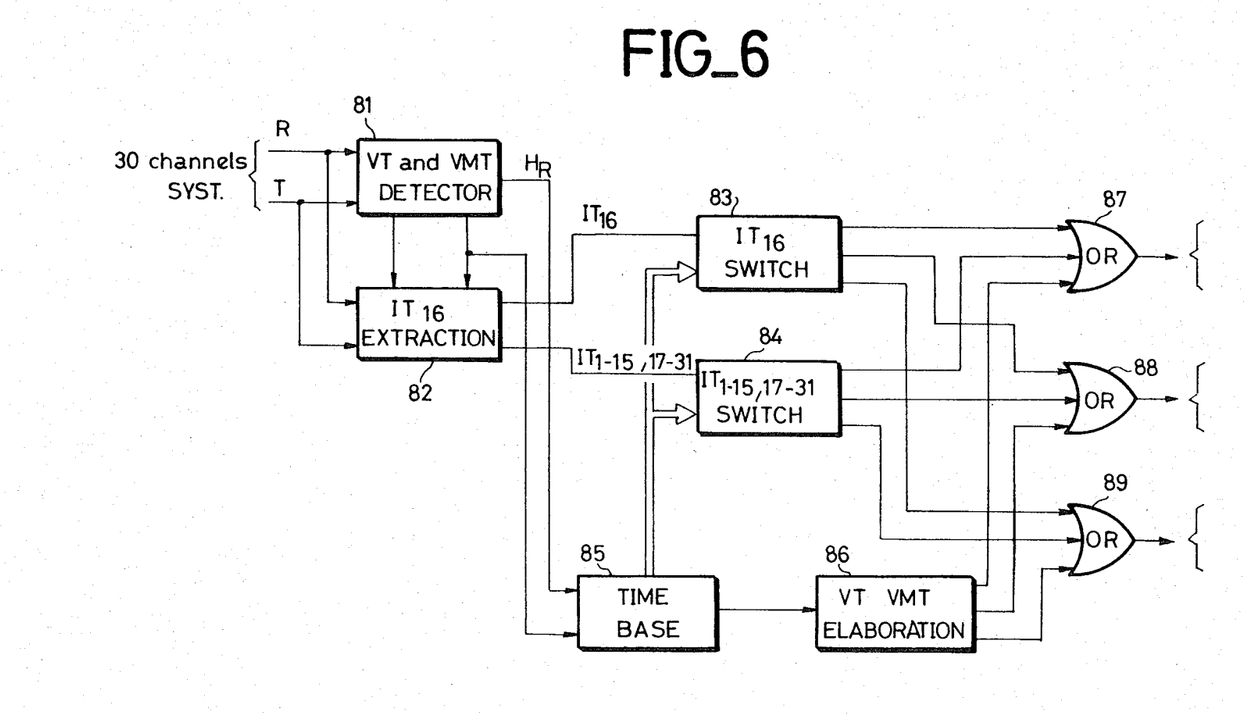
FIG. 6, showing on embodiment of a 3×10-channel demultiplexer as described in this invention.

FIG. 6 shows one embodiment of a 3×10-channel demultiplexer.

As before, the 30-channel system is represented by the sequence of frames T, expressed in binary code, and its associated rate of recovery R.

A VT and VMT-detector circuit (81) delivers a signal $H_R$ corresponding to the capacity of the 10-channel carrier (704 KHz) in the numerical example above, and frame and multiframe synchronization signals, which are sent, together with R and T data, to a 30-channel IT-extraction circuit (82), which directs $IT_{16}$ to a switching circuit (83), and other time intervals (except for $IT_0$) to a second switching circuit (84).

The device also contains a general time base circuit (85), which receives the signal $H_R$ and the 30-channel frame synchronization signal from the detector circuit (81), and delivers synchronization signals to the switching devices (83 and 84), together with a 10-channel frame synchronization signal to a 10-channel VT and VMT formulation device (86). The three outputs from each of the circuits 83, 84 and 86 are connected to three OR logic circuits (87, 88 and 89), each delivering the reformed 10-channel frames. As above, they may be followed by wave-shaping devices.

The invention is in no way confined to the description given here, and many variant forms are available to someone skilled in the art, without any departure from the spirit of the invention. For example, the invention applies in general to the multiplexing of N channels, where N is a number other than 10. Similarly, the coder and decoder, shown as common to all channels, may be divided up at individual channel level.

What is claimed is:

1. A process for time-sequenced multiplexing of data on a transmission medium, in which data for transmission is coded in the form of binary words, combined in frames and multiframes, a frame (T) containing a series of binary words representing the data for transmission, and auxiliary bits representing at least synchronization and signalling data, and a multiframe (MT) containing a series of successive frames, the process allowing N data channels to be multiplexed on a single carrier, each frame (T) containing N+1 binary words (IT) of the same length, only the first such word ($IT_o$) containing binary bits, and following words representing a coded sample of data to be transmitted on each channel respectively, the first word ($IT_o$) in odd index even ranking frames ($T_1$, $T_2$, $T_3$, $T_5$, $T_7$, $T_9$, $T_{11}$, $T_{13}$, $T_{15}$), in each multiframe containing synchronization signals (VT), signallying data (S) being contained in the first word (IT$_o$) of even index odd ranking frames (T$_2$, T$_4$, T$_8$, T$_{12}$, T$_{14}$), and being paired in the form S$_i$ and S$_{i+(N/2)}$, where S represents the signalling data and i the rank of the channel to which it refers, and in which N equals 10, and in which, for each multiframe, the first word (IT$_o$) in the first frame (T$_o$) contains a multiframe synchronization signal (VMT), the first word (IT$_o$) in every even-ranking frame (T$_1$-T$_{15}$) contains the same frame synchronization signal (VT), and the first word (IT$_o$) in some of the remaining odd-ranking frame contains channel-signalling data as follows:

third frame (T$_2$), signalling of channels 1 and 6;
fifth frame (T$_4$), signalling of channels 2 and 7;
ninth frame (T$_8$), signalling of channels 3 and 8;
thirteenth frame (T$_{12}$), signalling of channels 4 and 9;
fifteenth frame (T$_{14}$), signalling of channels 5 and 10.

2. A process for time-sequenced multiplexing of data on a transmission medium, in which data for transmission is coded in the form of binary words, combined in frames and multiframes, a frame (T) containing a series of binary words representing the data for transmission, and auxiliary bits representing at least synchronization and signalling data, and a multiframe (MT) containing a series of successive frames, the process allowing N data channels to be multiplexed on a single carrier, each frame (T) containing N+1 binary words (IT) of the same length, only the first such word (IT$_o$) containing binary bits, and following words representing a coded sample of data to be transmitted on each channel respectively, the first word (IT$_o$) in odd index even ranking frames (T$_1$, T$_2$, T$_3$, T$_5$, T$_7$, T$_9$,) T$_{11}$, T$_{13}$, T$_{15}$) in each multiframe containing synchronization signals (VT), signalling data (S) being contained in the first word (IT$_o$) of even index odd ranking frames (T$_2$, T$_4$, T$_8$, T$_{12}$, T$_{14}$), and being paired in the form S$_i$ and S$_{i+(N/2)}$, where S represents the signalling data and i the rank of the channel to which it refers, in which the process is applied to time-sequenced multiplexing of 30 data channels on a single carrier, in which a channel of one of three 10-channel systems corresponds to each of the said 30 channels, in accordance with the following table:

| 30-channel system channel n° | 10-channel system channel n° | | | | | | | | | |
|---|---|---|---|---|---|---|---|---|---|---|
| | 1 | 2 | 3 | 4 | 5 | 6 | 7 | 8 | 9 | 10 |
| 1st 10-channel system | 1 | 4 | 7 | 10 | 13 | 16 | 19 | 22 | 25 | 28 |
| 2nd 10-channel system | 2 | 5 | 8 | 11 | 14 | 17 | 20 | 23 | 26 | 29 |
| 3rd 10-channel system | 3 | 6 | 9 | 12 | 15 | 18 | 21 | 24 | 27 | 30 |

3. A multiplexing device to implement the process as defined in claim 2, to multiplex three 10-channel systems in order to form a 30-channel system, comprising for each 10-channel system, means of detecting frame and multiframe data and generating a frame synchronization signal, and means of extracting and storing synchronization signals and data for transmission, and further comprising means of phasing the multiframes of the three 10-channel systems, to which the said extractions means are connected, and a time base circuit delivering on the basis of 30-channel clock and synchronization signals, synchronization signals to the rest of the device, thereby sequencing data in the three 10-channel systems to form the 30-channel system.

4. A demultiplexing device to implement the process defined in claim 2, in order to demultiplex a 30-channel system to form three 10-channel systems, comprising:
means of detecting frame and multiframe synchronization signals;
means of extracting signalling data and data for transmission;
two switching circuits, one receiving signalling data and the other receiving data for transmission from the extraction circuit;
means of establishing 10-channel system frame and multiframe synchronization signals;
a circuit forming a time base, and delivering, on the basis of the frame synchronization signal and frequency corresponding to carrier capacity, synchronization signals to the rest of the device, and sequencing the delivered data.

* * * * *